United States Patent
Dudinsky et al.

(10) Patent No.: US 10,908,250 B1
(45) Date of Patent: Feb. 2, 2021

(54) SELF SURVEYING NAVIGATION SYSTEM

(71) Applicant: United States of America as represented by the Secretary of the Navy, Arlington, VA (US)

(72) Inventors: John Dudinsky, Panama City, FL (US); Phillip Bernstein, Panama City, FL (US); Paul Moser, Panama City, FL (US); Daniel Kucik, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 198 days.

(21) Appl. No.: 16/357,625

(22) Filed: Mar. 19, 2019

(51) Int. Cl.
| | |
|---|---|
| *G01S 1/74* | (2006.01) |
| *G01S 19/51* | (2010.01) |
| *B63G 8/00* | (2006.01) |
| *G05D 1/10* | (2006.01) |

(52) U.S. Cl.
CPC ............... *G01S 1/74* (2013.01); *B63G 8/001* (2013.01); *G01S 19/51* (2013.01); *G05D 1/10* (2013.01); *B63B 2211/02* (2013.01); *B63G 2008/004* (2013.01)

(58) Field of Classification Search
CPC .......... G01S 1/74; G01S 19/51; B63G 8/001; B63G 2008/004; G05D 1/10; B63B 2211/02
See application file for complete search history.

(56) References Cited

U.S. PATENT DOCUMENTS 7,296,530 B1 * 11/2007 Bernstein ............... B63G 8/001
    114/322
2017/0328982 A1 * 11/2017 Jongsma ................... G01S 1/70

\* cited by examiner

*Primary Examiner* — Marthe Y Marc-Coleman
(74) *Attorney, Agent, or Firm* — James T. Shepherd

(57) ABSTRACT

An unmanned underwater vehicle (UUV) is equipped with a GPS, heading sensor, depth and altitude sensors, and an acoustic navigation system. The UUV is deployed in the vicinity of the target location and releases an acoustic transponder (beacon). Using the acoustic navigation system with the GPS reference, the UUV conducts a survey to determine the horizontal location of the beacon on the seafloor and calculates a relative position between the beacon and the target. The UUV can plan a travel path allowing it to relocate the target, using the beacon as a navigation aid. The UUV can submerge to target depth and search for the target using a forward looking sensor. Once the target is acquired on the sensor, the UUV can home to the target.

19 Claims, 3 Drawing Sheets

SELF SURVEYING NAVIGATION SYSTEM

STATEMENT OF GOVERNMENT INTEREST

The invention described herein may be manufactured and used by or for the Government of the United States of America for governmental purposes without the payment of any royalties.

BACKGROUND OF THE INVENTION

(1) Field of the Invention

The present invention relates to a system and method for underwater navigation. More particularly, the present invention relates to a system and method for target reacquisition using underwater navigation relative to a known position using an acoustic transponder deployed at relatively close range to the target.

(2) Description of the Prior Art

There exist a number of scenarios in which an underwater target has been previously localized by a first system and is to be relocated by a second system at a later time. For Example, a surface ship may locate an undersea target using sonar, and ascertain its depth and horizontal location (latitude-longitude). However, the surface ship may not have the capability to directly observe or perform an underwater investigation of the target.

Generally, an unmanned underwater vehicle (UUV) will be deployed to observe, investigate, or retrieve the target. While the UUV can utilize a known GPS navigation system to locate the target position at the water surface, the UUV will need to be equipped with costly inertial or Doppler velocity sensors in order to reacquire the target during its underwater search.

Thus, a need exists for systems and methods for underwater target reacquisition.

SUMMARY OF THE INVENTION

It is therefore an object of this present invention to provide an underwater target reacquisition system and method using less costly UUV's. To lower costs, these UUV's should employ commercial off the shelf technology without the need for expensive Doppler velocity sensors or inertial guidance systems. Underwater navigation to reacquire a target need only require simple GPS technology and known acoustic transponder signal processing.

The invention includes a UUV equipped with commercial off the shelf GPS, heading sensor, depth and altitude sensors, and an acoustic navigation system (active acoustic transmitter and directional receiver). The UUV is air dropped or surface deployed in the vicinity of the target location. The UUV swims on the surface to a point near the subsurface target's location, at which point the UUV releases an acoustic transponder, referred to hereinafter as a beacon. The beacon drops to the sea floor.

The UUV travels on the sea surface away from the beacon and conducts a survey to determine the horizontal location of the beacon on the seafloor using the acoustic navigation system, with a GPS reference. At this point, the UUV can calculate a relative position between the beacon and the target using the surveyed beacon position and the known target position.

Based on its current GPS location, the UUV plans a travel path which allows it to relocate the target, using the beacon as a navigation aid. The travel path will be planned such that the UUV approaches the target with the beacon behind or down range of the target to keep the beacon in acoustic view of the UUV. The UUV submerges, utilizing the beacon as a navigation aid, and proceeds to target depth and searches for the target using a forward looking sensor. The UUV can then acquire the target on its sensor and can home to the target.

In one embodiment, an underwater target is to be reacquired. The target is at a known depth below the sea surface and a surface latitude-longitude location of the target are also known. The method includes releasing a beacon at a surface position near the surface location of the target. The beacon descends to a sea floor position and the latitude-longitude coordinates of the sea floor position are determined.

A relative position between the beacon and the target is determined based on the known depth of the target, the known surface position of the target and the latitude-longitude coordinates of the sea floor position of the beacon. A search path of a reacquisition vehicle is planned based on this relative position, such that the vehicle maintains the beacon downrange of the target as the vehicle proceeds along the path to acquire the target.

In determining the latitude-longitude coordinates of the sea floor position of the beacon, a through water survey is performed from a surface standoff location distant from the surface position where the beacon was released. The through water survey can include determining a range and a bearing to the beacon using an ultra-short baseline navigation technique.

The through water survey can also include taking range readings to the beacon from multiple standoff locations and correlating the range readings with the GPS-determined coordinates for each of the standoff locations. The range readings can be taken from at least three standoff locations, with the distance from the release position to each of the standoff positions being at least equal to the depth of the target.

In one embodiment, the water may be shallow such that drifting of the beacon from the release location is negligible. In this case, the latitude-longitude coordinates of the sea floor position of the beacon can be assumed to be the GPS-determined coordinates of the release position. For these purposes, a water depth of about less than forty feet is considered shallow.

In one embodiment, the reacquisition vehicle is an unmanned underwater vehicle (UUV). The UUV is deployed at the sea surface and the UUV navigates to the surface position near the surface location of the target and releases the beacon. In determining the latitude-longitude coordinates of the sea floor position of the beacon the UUV navigates to the standoff location and performs the through water survey.

In executing the search path, the UUV submerges to the target depth to begin its search for the target. The UUV maintains the beacon downrange of the target to home in on the target along the search path. Homing to the target can include implementing forward looking sonar aboard the UUV to navigate toward the beacon.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein.

DESCRIPTION OF THE INVENTION

Figure 1:
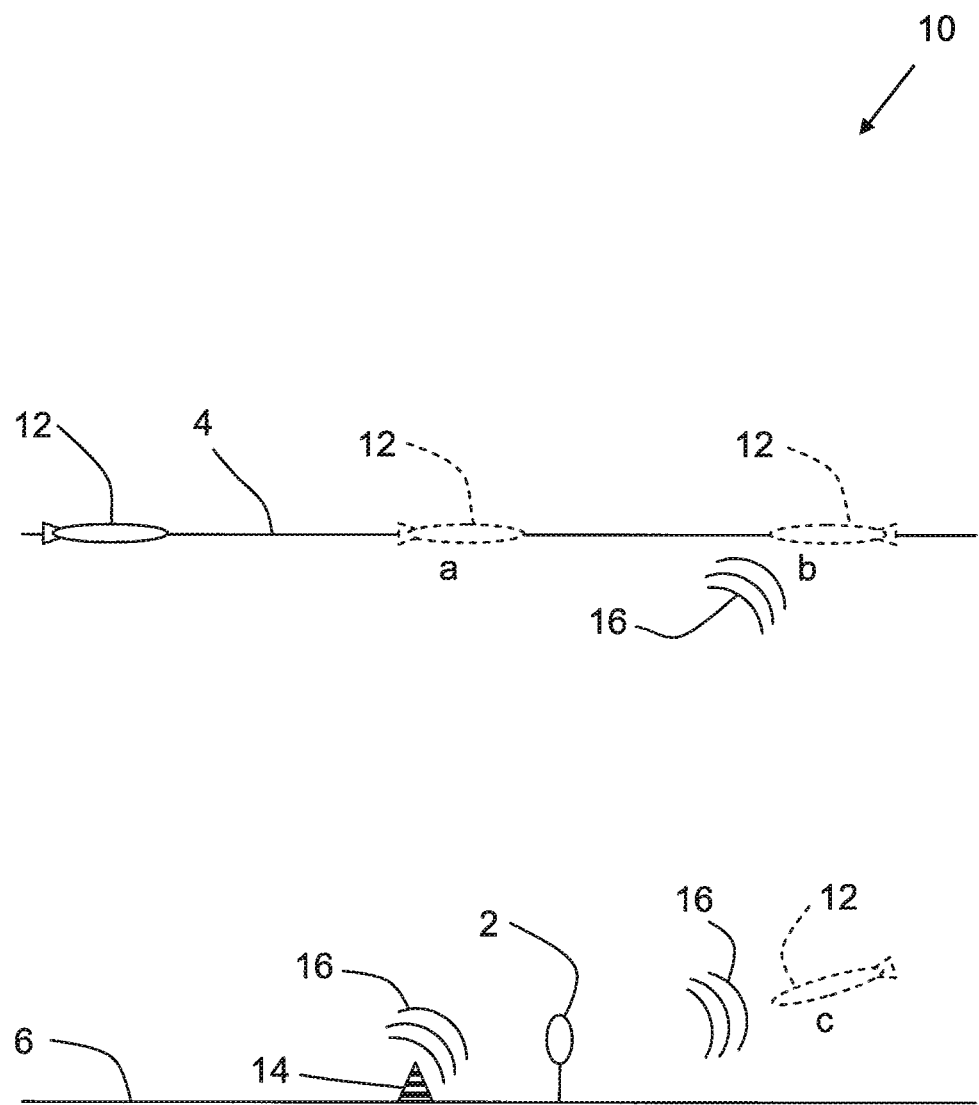
FIG. 1 illustrates a schematic view of a self-surveying navigation system for target reacquisition.

Referring now to FIG. 1, there is shown a schematic view of self-surveying navigation system 10 for reacquisition of target 2. Target 2 has been previously localized by another system (not shown), such that target 2 depth and horizontal location (latitude-longitude) is known. Unmanned Underwater Vehicle (UUV) 12 is now tasked to reacquire target 2. A more detailed description of UUV 12 is provided hereinafter with reference to FIG. 2 and FIG. 3. A brief description of target 2 reacquisition with reference to FIG. 1 follows. A more detailed description of target 2 reacquisition is provided hereinafter with reference to FIG. 4. For illustrative purposes in FIG. 1, various positions (positions a, b and c) of UUV 12 during reacquisition are shown in phantom.

UUV 12 is deployed on sea surface 4 in the general vicinity of target 2. Upon reaching a surface point near the horizontal location of target 2 (position a), UUV 12 releases acoustic transponder 14 (referred to hereinafter as beacon 14), which drops to sea floor 6. Using signal 16 from beacon 14, UUV 12 conducts a survey (position b) to determine the horizontal location of beacon 14 and hence the relative position between beacon 14 and target 2. Using beacon 14 as a navigation aid, UUV 12 can submerge (position c) to known target 2 depth and home in to target 2.

Figure 2:
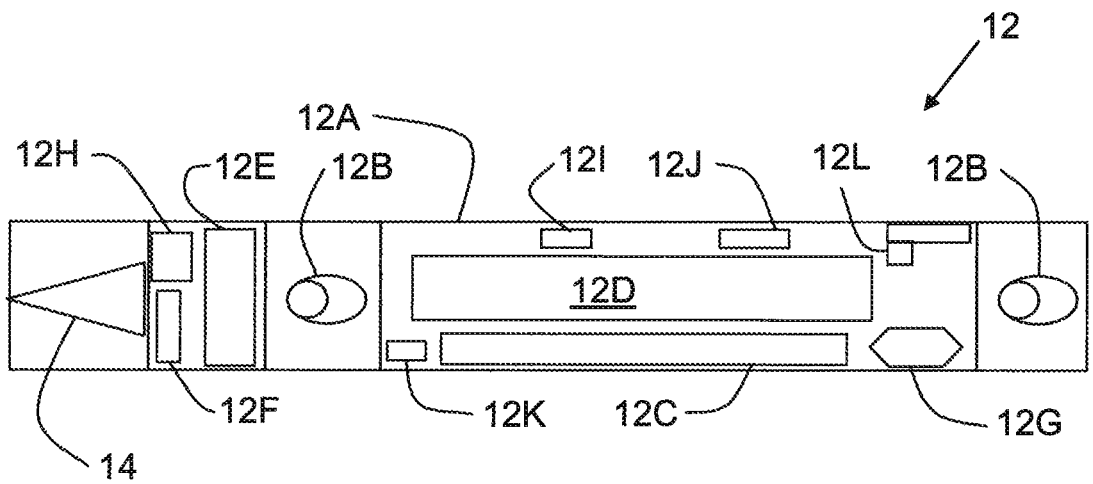
FIG. 2 illustrates a schematic cross-sectional view of a self-surveying UUV for the system of FIG. 1.

Referring now to FIG. 2, there is shown a schematic cross-sectional view of self-surveying UUV 12. Contained within outer shell 12A are standard components typically found in disposable UUV's. For illustrative purposes, but not limitation, these include propulsion system 12B, which can propel UUV 12 in multiple directions. Battery 12C provides power for propulsion and other onboard systems, including navigation processor 12D and sonar processor 12E. Additional components include forward looking sonar 12F, acoustic transmitter 12G, directional receiver 12H, depth sensor 12I, heading sensor 12J and altitude sensor 12K.

In addition to these standard components, UUV 12 can be equipped with Global Positioning System (GPS) receiver 12L. Navigation processor 12D receives inputs from GPS 12L, and sensors 12I, 12J and 12K to control propulsion system 12B to maneuver UUV 12 both on and below sea surface 4. UUV 12 further includes releasable beacon 14, as described with reference to FIG. 1.

Figure 3:
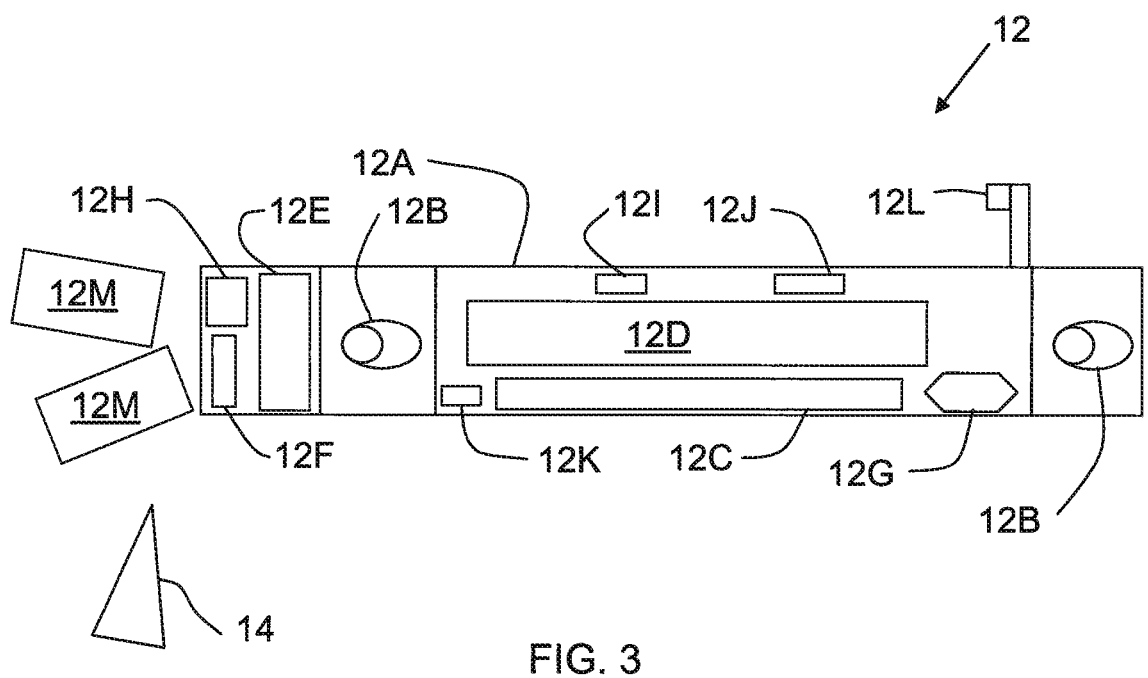
FIG. 3 shows the schematic cross-sectional view of the UUV of FIG. 2 with a GPS system and a beacon deployed from the UUV.

Referring now to FIG. 3, there is shown a schematic cross-sectional view of UUV 12 with GPS system 12L and beacon 14 deployed by UUV 12. For illustrative purposes, but not limitation, beacon 14 is shown deployed from break away nose section 12M of UUV 12. Deployment of beacon 14 can be accomplished using multiple known methods allowing beacon 14 to be dropped to the seafloor. GPS system 12L is deployed such that UUV 12 can conduct the survey (described with reference to FIG. 1) to determine the relative position between beacon 14 and target 2.

Figure 4:
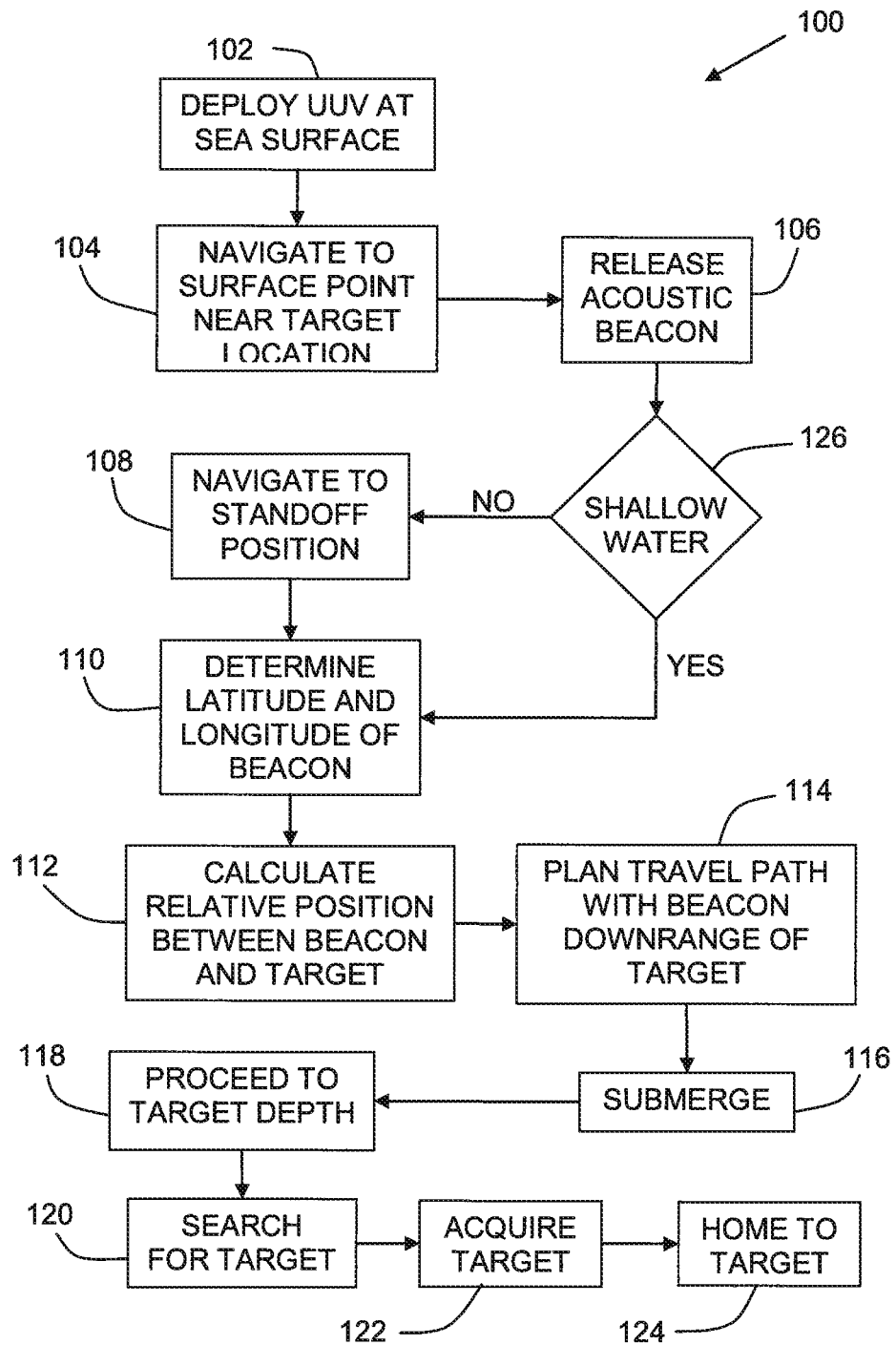
FIG. 4 illustrates a block diagram of a method for target reacquisition using underwater navigation relative to a known position.

Referring now to FIG. 4, there is shown a block diagram of method 100 for reacquisition of target 2. As noted above, target 2 has been previously localized by another system, such that target 2 depth below the sea surface and horizontal location (latitude-longitude) at the sea surface is known. At block 102 of method 100, UUV 12 is deployed on the sea surface in the vicinity of target 2 location.

Using GPS system 12L, onboard navigation processor 12D, and sensors 12I, 12J and 12K (shown in FIG. 3), UUV 12 navigates on the surface to a point near target 2 location (block 104). Upon reaching target 2 location, UUV 12 releases acoustic beacon (block 106), which drops to the sea floor. Depending on sea currents, beacon 14 is expected to land on the sea floor within 50 meters of target 2, but is estimated not to exceed 200 meters from target 2. These distances ensure that beacon 14 remains within acoustic range of target 2. They further minimize navigation error and maximize probability of subsequent reacquisition of target 2.

UUV 12 then navigates on the surface from the point at which UUV 12 released beacon 14 to a standoff position (block 108), shown as position b in FIG. 1. The horizontal standoff distance between beacon 14 and UUV 12 is dependent on water depth, and is selected to ensure a favorable geometry for the navigation technique being used. The standoff distance should be approximately the same as the depth of the water, which is a known input prior to the mission.

UUV 12 then conducts a survey to determine the horizontal location (latitude and longitude) of beacon 14 on the seafloor (block 110). In addition to the components used for surface navigation, as previously described, UUV 12 can utilize sonar processor 12E, forward looking radar 12F, acoustic transmitter 12G and directional receiver 12H to conduct the survey at block 110.

The components of UUV 12 described with respect to FIG. 2 and FIG. 3 provide the capability for UUV 12 to perform the through-water survey using multiple known techniques. This includes, but is not limited to, determining range and bearing to beacon 14 using an Ultra-Short Base-Line (USBL) navigation technique. As another example, the survey can include taking multiple range readings at various ranges, and correlating these range readings with the GPS-determined location of UUV 12. To ensure accuracy in the case of multiple range readings, at least three range readings would be taken, at a surface separation distance that is equal to or larger than the water depth.

Based on the determined position of beacon 14 and the known target 2 position, UUV 12 can calculate a relative position between beacon 14 and target 2 (block 112). Based on the current GPS location of UUV 12, a travel path for UUV 12 can be planned (block 114), which allows UUV 12 to relocate target 2, using beacon 14 as a navigation aid. The travel path will be planned such that UUV 12 approaches target 2 with beacon 14 behind (or downrange of) target 2, keeping beacon 14 in acoustic view of UUV 12. (See also FIG. 1, position c.)

Based on the travel plan and utilizing beacon 14 as a navigation aid, UUV 12 submerges (block 116), proceeds to target depth (block 118) and searches (block 120) for target 2 using forward looking sonar 12F. Upon acquiring target 2 (block 122), UUV 12 homes in to target 2 (block 124).

What has thus been described is a self-surveying navigation system 10 and method 100 for reacquisition of a target 2 at a previously known location. A UUV 12 is deployed on the sea surface in the general vicinity of the target 2. Upon reaching a surface point near the horizontal location of the target 2, the UUV 12 releases a beacon 14, which drops to the sea floor. Using a signal from the beacon 14, the UUV 12 conducts a survey to determine the horizontal location of the beacon 14 and hence the relative position between the beacon 14 and the target 2. Using the beacon 14 as a navigation aid, the UUV 12 can submerge to the known target depth and home in to the target 2.

Obviously, many modifications and variations of the present invention may become apparent in light of the above teachings. For example, target 2 may be located in shallow water, i.e. less than about 40 feet. In this case, the drift of beacon 14 during descent can be deemed small enough as to not contribute significantly to navigational error.

Thus, the determined location of beacon 14 can be assumed to be the location of UUV 12 when beacon 14 was released (block 106) and UUV 12 need not navigate to a standoff position (block 108) to perform a survey. Referring to FIG. 4, block 126 indicates the choice (based on the depth of the water) to navigate to a standoff position (block 108) or directly determine the location of beacon 14 (block 110) using the location of UUV 12 at the time beacon 14 was released.

Also, the range from target 2 when UUV 12 is deployed at block 102 can be variable. A range on the order of 100-300 meters is deemed reasonable to allow UUV 12 to proceed to the point for deployment of beacon 14 in a relatively short time frame and thus conserve battery 12C power.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. An underwater target reacquisition method, wherein a depth of the target beneath a sea surface and a surface latitude-longitude location of the target are known, said method comprising:
   releasing a beacon at a surface position near the known surface location of the target, said beacon descending to a sea floor position;
   determining latitude-longitude coordinates of said sea floor position of said beacon;
   calculating a relative position between said beacon and the target based on the known depth of the target, said the surface position of the target and said latitude-longitude coordinates of said sea floor position of said beacon;
   planning a search path of a reacquisition vehicle based on said relative position, such that said search path maintains said beacon downrange of the target; and
   executing said search path by said reacquisition vehicle to acquire the target.

2. The method of claim 1, wherein said step of determining latitude-longitude coordinates of said sea floor position of said beacon further comprises performing a through water survey from a surface standoff location distant from said surface position.

3. The method of claim 2, wherein said through water survey comprises determining a range and a bearing to said beacon using an ultra-short baseline navigation technique.

4. The method of claim 2, wherein said through water survey comprises:
   taking range readings to said beacon from multiple standoff locations; and
   correlating said range readings with GPS-determined coordinates for each of said multiple standoff locations.

5. The method of claim 4, wherein:
   range readings to said beacon are taken from at least three standoff locations; and
   a distance from said surface position to each of said multiple standoff positions is at least equal to the known depth of the target.

6. The method of claim 1, wherein:
   a shallowness of the depth of the target lessens a drifting distance between said surface position and said sea floor position of said beacon; and
   said step of determining said latitude-longitude coordinates of said sea floor position of said beacon comprises using GPS-determined coordinates of said surface position as said latitude-longitude coordinates of said sea floor position.

7. The method of claim 6, wherein said shallowness comprises a depth less than forty feet.

8. The method of claim 1, wherein said reacquisition vehicle is an unmanned underwater vehicle.

9. The method of claim 8, further comprising:
   deploying said unmanned underwater vehicle at the sea surface; and
   navigating said unmanned underwater vehicle to said surface position, said unmanned underwater vehicle releasing said beacon at said surface position.

10. The method of claim 9, wherein said step of determining latitude-longitude coordinates of said sea floor position of said beacon further comprises:
    navigating said unmanned underwater vehicle to a standoff location distant from said surface position; and
    performing a through water survey from said unmanned underwater vehicle at said standoff position.

11. The method of claim 10, wherein said through water survey comprises determining a range and a bearing to said beacon using an ultra-short baseline navigation technique.

12. The method of claim 10, wherein said through water survey comprises:
    taking range readings to said beacon from multiple standoff locations; and
    correlating said range readings with GPS-determined coordinates for each of said multiple standoff locations.

13. The method of claim 12, wherein:
    range readings to said beacon are taken from at least three standoff locations; and
    a distance from said surface position to each of said multiple standoff positions is at least equal to the known depth of the target.

14. The method of claim 10, wherein said step of executing said search path further comprises:
    submerging said unmanned underwater vehicle to the known depth of the target; and
    homing to the target via said path.

15. The method of claim 14, wherein said step of homing to the target comprises implementing forward looking sonar aboard said unmanned underwater vehicle to navigate toward said beacon.

16. The method of claim 9, wherein:
    a shallowness of the depth of the target lessens a drifting distance between said surface position and said sea floor position of said beacon; and
    said step of determining said latitude-longitude coordinates of said sea floor position of said beacon comprises determining GPS coordinates of said unmanned underwater vehicle when it released said beacon.

17. The method of claim 16, wherein said shallowness comprises a depth less than forty feet.

18. The method of claim 17, wherein said step of executing said search path further comprises:
   submerging said unmanned underwater vehicle to the known depth of the target; and
   homing to the target via said path.

19. The method of claim 18, wherein said step of homing to the target comprises implementing forward looking sonar aboard said unmanned underwater vehicle to navigate toward said beacon.

* * * * *